Nov. 9, 1943.                G. O. BENSON                2,333,632
                              FISH REEL
                         Filed Aug. 12, 1940
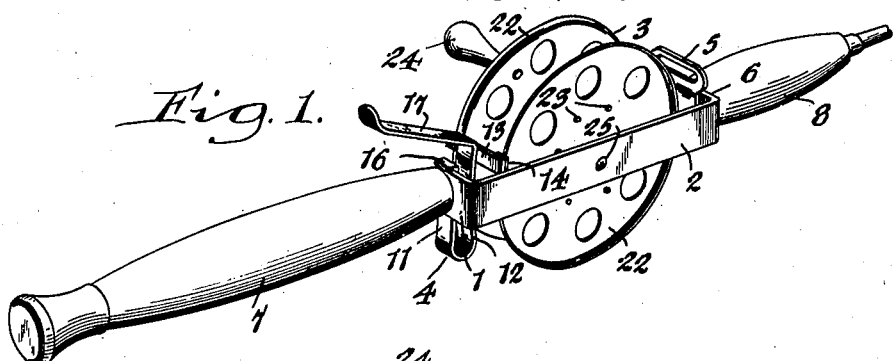
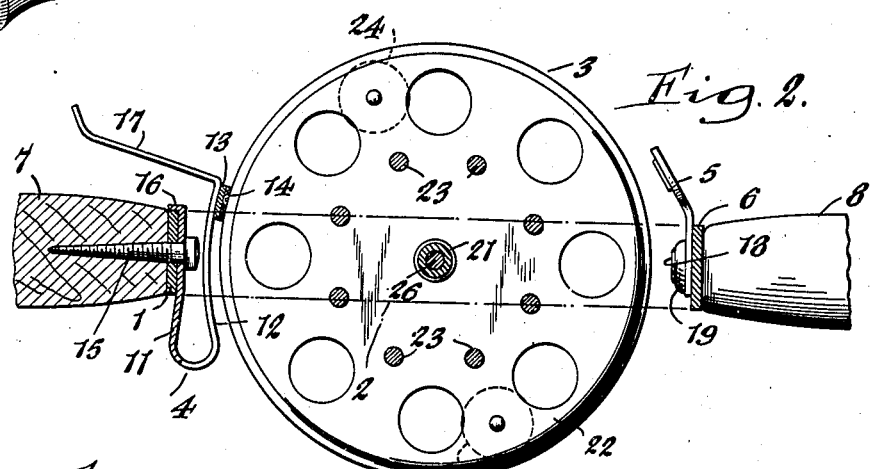
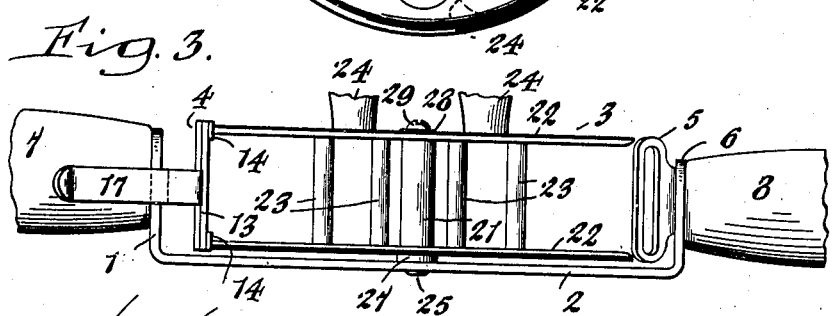
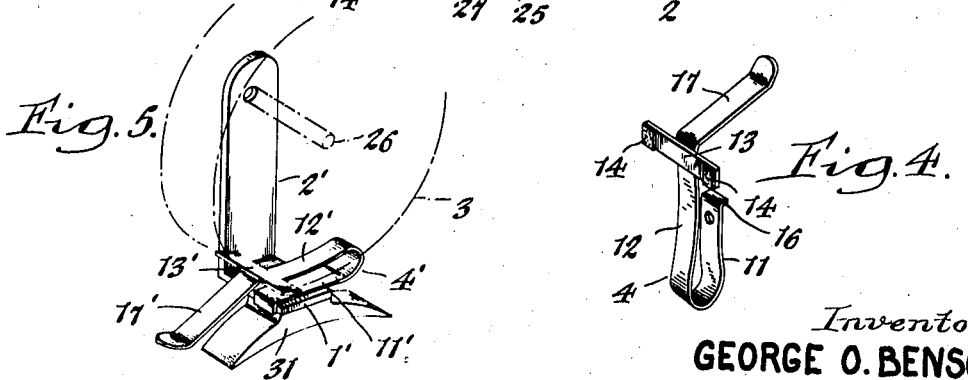
Inventor,
GEORGE O. BENSON
by W. F. Poley
    Attorney.

UNITED STATES PATENT OFFICE 2,333,632

FISH REEL

George O. Benson, Niagara Falls, N. Y.

Application August 12, 1940, Serial No. 352,284

3 Claims. (Cl. 43—20)

This invention relates to reels for fish lines and has for its object the provision of an improved article of the class referred to. More particularly, the object of the present invention is to provide a fish line reel that has an effective braking member for controlling the paying out of the line, and one that is convenient to use and economical to manufacture.

Drawing illustrating two modifications of the invention is made a part of this specification to afford a better understanding of the invention, but it is in no-wise intended to limit the scope of the invention to the exact modifications shown.

In the drawing—

Figure 1 is a perspective view of one modification of the present invention;

Figure 2 is a side view, partly in section, of the modification shown in Figure 1;

Figure 3 is a top view of the modification shown in Figure 1;

Figure 4 is a perspective view of the brake element illustrated in the Figures 1, 2 and 3; and Figure 5 is a perspective view of a modification of the present invention adapted for detachable mounting on a fish pole.

Throughout the specification and drawing, similar reference numerals denote corresponding parts.

The modification illustrated in Figures 1, 2 and 3 comprises a plate 1 having an arm 2 projecting normally from an end thereof, a spool 3 rotatably mounted on said arm 2, a brake element 4 positioned between the sides extended of said spool and fastened to said plate 1 and in engagement with said spool 3, and a forward line guide 5. The arm 2 in conjunction with the rear plate 1 and a similar forward plate 6 constitutes a frame that serves to join the rear hand grip 7 and the forward hand grip 8, as well as to support the spool 3.

In Figure 2, the arm 2 is shown in dot and dash lines in order to illustrate more clearly the arrangement of the various parts, especially the brake element 4, with respect to the rear hand grip 7 and the spool 3. As illustrated in Figure 2, the brake element 4 comprises a a return bend spring having a short leg 11 in engagement with the rear plate 1 forming a part of the spool supporting frame, and a longer leg 12 that passes between the said short leg 11 and the spool 3 and, in its normal position, engages the spool 3 by virtue of the transverse member 13 and the friction facing 14 thereof.

The shorter leg 11 of the brake element 4 is perforated to permit the body, but not the head, of the screw 15 to pass through the element and force the same into intimate engagement with the plate 1. The plate 1 also is perforated to permit the body of the screw 15 to pass therethrough and into the rear hand grip. The screw 15 thus draws the short leg 11 of the brake element 4, the rear plate 1 and the rear hand grip 7 into a rigid structure. The short leg 11 of the brake element 4 is provided with a normally extending projection 16 at its end, and this projection or lug engages the edge of the rear plate 1 to prevent the brake element 4 from turning about the screw 15 as a pivot.

The longer leg 12 of the brake element 4 is bent back sharply and extended to a convenient point rearwardly of the juncture of the spool frame and the rear hand grip. This rearward extension 17 of the longer leg 12 of the brake element 4 thus is positioned above the rear hand grip 7 and in proximity thereto, so that it can be reached readily and comfortably by the index finger of the left hand of the fisherman, if the rear hand grip 7 is being held by the left hand, or by the thumb of the right hand if the rear hand grip is being held by the right hand of the fisherman.

Pressure upon the extension 17 by the finger, or by the thumb, as the case may be, causes the frictional engagement of the brake element to be lessened, and even removed entirely if of sufficient intensity.

The forward hand grip may be joined to the forward plate 6 of the spool supporting frame in any suitable manner, but, as illustrated in Figures 1 and 2, the hand grip itself is slipped over a supporting pin 18 while the pin itself is riveted over against the bushing 19, which thereby forces the line guide 5 into rigid engagement with the forward plate 6 of the spool supporting frame.

Figure 3 illustrates, among other things, more of the details of the spool 3 and the engagement therewith of the brake element 4. The spool 3, as illustrated, comprises a hollow support 21, perforated side plates 22 mounted thereon, a plurality of spacing pins 23 that serve to rigidify the spool and also provide a foundation upon which the fish line may be wound, and a plurality of handles 24 for causing rotation of the spool upon its axle 25.

The axle 25, upon which the spool 3 is rotatably mounted, comprises a pin 26 having an enlarged base 27, which serves as an abutting head against the arm 2 of the frame and also as a spacer to keep the spool away from said arm 2.

The pin 26 passes through a hole in the arm 2 of the frame and is riveted over to rigidly unite it with the said arm 2 of the frame.

A washer 28 and a screw 29, which is in threaded relationship with the pin 26, serve to hold the spool 3 on the said pin 26.

The brake element 4 illustrated in Figure 4 is of the type shown also in Figures 1, 2 and 3 and comprises the return bend element having a shorter leg 11 and a longer leg 12 and the transverse member 13, which may be integral with the longer leg 12 or a separately formed piece fastened to said longer leg by spot welding, by riveting or by any other suitable means. As illustrated, the brake element 4 also comprises two pieces of friction material 14 so positioned that they will engage the spool side plates 22 when the element is in position. These elements may be, for example, hard rubber containing asbestos or other suitable filler, and vulcanized to the transverse member 13. If not desired, these friction elements may be omitted.

While the separate brake element 4 illustrated in Figure 4 is in the form of a return bend the same as illustrated in the assembly drawing, namely Figures 1, 2, 3 and 5, assembly of the device can be effected more conveniently if the element is drawn against the rear plate 1 by means of the screw 15 in the modification shown in Figures 1, 2 and 3 or welded to the rear plate in the modification shown in Figure 5, before the return bend is completed and prior to the time the spool 3 is positioned on the spindle 26. With the brake element firmly engaging the rear plate 1, completion of the return bend can be effected readily.

A convenient way to attach the brake element of the modification shown in Figures 1, 2 and 3 comprises inserting the screw 15 into the hole in the brake element stamping before it has been bent into the shape illustrated and then, with the head of the screw abutting the element, bending the element into the final shape, then holding the screw in a suitable jig to prevent it from turning and then rotating the handle on the screw until it engages the plate and draws the various elements into a firm structure.

There sometimes is a preference for a handle having the reel brake at the forward grip instead of at the rear grip, as described above. Such preference can be met in the present invention by omitting the particular line guide 5 shown in the drawing and fastening in its place a brake element of the same kind as that described and illustrated herein. The modification can be completed by the utilization of another type of line guide, such as one pivoted on the spool supporting axle.

The modification of the present invention illustrated in Figure 5 is intended to be detachably mounted on a fish pole or the handle thereof. Like the modification shown in Figures 1, 2 and 3, it comprises a plate 1' and an arm 2' projecting normally therefrom. The arm 2' carries a pin for the rotatable support of a spool. In this modification, however, the brake element 4', which comprises a return bend element having a shorter leg 11', a longer leg 12' and a transverse member 13', is joined directly, as by spot welding, to the plate 1' and a mounting foot 31 also is joined directly, as by spot welding, to the other side of said plate 1'. Because of the different manner in which the assembly is mounted on the fish pole or the handle thereof, the rearward extension 17' of the brake element is not bent back as sharply as in the modification previously described.

The present invention provides a device that is sturdy, economical to make and convenient to use. The brake element being located close to the hand grip from which it is operated, and, having an extension located adjacent to said hand grip, affords close and convenient control of the spool and of the line wound thereon. Slight pressure on the extension of the brake element, urging it toward the hand grip, lessens the drag on the spool and thereby permits it to pay out line more easily; greater pressure removes the drag and permits the spool to pay out freely. Removal of pressure from the extension permits the return bend spring to apply pressure to the spool and thereby cause a braking action on said spool.

While the invention has been illustrated by modifications utilizing a brake element that engages both side plates of the spool by means of a transverse member carried by a return bend spring, it will be obvious that the invention is not limited to the exact modifications shown, but is measured by the appended claims.

Having thus described my invention, I claim:

1. A fishing reel comprising a plate with an arm projecting normally from an end thereof, a shaft fastened to said arm and projecting parallel to said plate, a spool rotatably mounted on said shaft, and a brake for said spool comprising a return bend spring positioned between the sides extended of said spool and having legs of different lengths, the shorter of said legs being fastened to said plate and having a normally extending projection at the end thereof in engagement with the edge of said plate, and the longer of said legs being in engagement with said spool and extending beyond the opposite edge of said plate.

2. A fishing reel comprising a plate with an arm projecting from an end thereof, a shaft fastened to said arm and projecting parallel to said plate, a spool rotatably mounted on said shaft, and a brake for said spool comprising a return bend spring positioned between the sides extended of said spool and having legs of different lengths, the shorter of said legs being fastened to said plate by a single screw and having a normally extending projection at the end thereof in engagement with the edge of said plate, and the longer of said legs being in engagement with said spool and extending beyond the edge of said plate.

3. A fishing reel comprising a plate with an arm projecting normally from an end thereof, a shaft fastened to said arm and projecting parallel to said plate, a spool rotatably mounted on said shaft, a handle in engagement with said plate, and a brake for said spool comprising a return bend spring positioned between the sides extended of said spool and having legs of different lengths, the shorter of said legs being fastened to said plate and said handle by a single screw which passes through said leg and said plate and into said handle, the said shorter leg having a normally extending projection at the end thereof in engagement with the edge of said plate, and the longer of said legs being in engagement with said spool and extending beyond the edge of said plate.

GEORGE O. BENSON.